United States Patent [19]

Lo

[11] Patent Number: 5,410,798
[45] Date of Patent: May 2, 1995

[54] METHOD FOR PRODUCING A COMPOSITE GOLF CLUB HEAD

[76] Inventor: Kun-Nan Lo, No. 33, Hsiang-Ho Rd., Li-Lin Tsun, Tan-Tzu Hsiang, Taichung Hsien, Taiwan, Prov. of China

[21] Appl. No.: 178,042

[22] Filed: Jan. 6, 1994

[51] Int. Cl.[6] .......................................... B23P 11/02
[52] U.S. Cl. .................................. 29/527.2; 264/241; 264/248; 264/314; 273/167 H
[58] Field of Search ............... 29/527.2; 264/248, 241, 264/314; 273/167 H

[56] References Cited

U.S. PATENT DOCUMENTS

| 4,575,447 | 3/1986 | Hariguchi | 273/167 H X |
| 5,064,197 | 11/1991 | Eddy | 273/167 H |
| 5,122,324 | 6/1992 | Yong-Sup | 273/167 H X |
| 5,135,227 | 8/1992 | Okumoto et al. | 273/167 H X |
| 5,178,392 | 1/1993 | Santioni | 273/167 H |
| 5,262,118 | 11/1993 | Fukushima et al. | 273/167 H X |
| 5,263,713 | 11/1993 | Taylor et al. | 273/167 H X |
| 5,350,556 | 9/1994 | Abe et al. | 273/167 H X |

FOREIGN PATENT DOCUMENTS 2247628  11/1992  United Kingdom ........... 273/167 H

Primary Examiner—Carl J. Arbes
Attorney, Agent, or Firm—Curtis, Morris & Safford

[57] ABSTRACT

A method for producing a composite golf club head includes the steps of forming a metal hollow casing; disposing a bowl-shaped laminated member in the metal hollow casing; providing an expansible pocket in the bowl-shaped laminated member, the expansible pocket containing a mixture of sodium nitrite, ammonium chloride and water; disposing a sheet of carbon fiber composite material over an open top portion of the metal hollow casing, in order to close the open top portion of the metal hollow casing and the open end of the bowl-shaped laminated member; disposing the metal hollow casing in a mold; and heating the mold to a temperature of 140°–160° C., in order to allow the mixture in the expansible pocket to react and produce nitrogen gas in the expansible pocket, thereby swelling the expansible pocket and forcing the bowl-shaped laminated member to attach to the metal hollow casing, and allowing the sheet of carbon fiber composite material and the bowl-shaped laminated member to harden and connect integrally to each other.

2 Claims, 3 Drawing Sheets

METHOD FOR PRODUCING A COMPOSITE GOLF CLUB HEAD

BACKGROUND OF THE INVENTION

1. Field of the Invention

This invention relates to a method for producing a composite golf club head, more particularly to a method for producing a composite golf club head, which includes the step of providing an expansible pocket in the metal hollow casing of the golf club head in order to compress the bowl-shaped laminated member and thereby attach the internal wall of the metal hollow casing.

2. Description of the Related Art

In the prior art, it is advantageous that the golf club head is made of a composite material. FIG. 1 shows a conventional composite golf club head which comprises a metal hollow casing 11, a sheet of carbon fiber composite material 12, and a striking plate 13 which is made of a special alloy. The known method for producing a conventional composite golf club head comprises the steps of:

(1) forming the metal hollow casing 11 which has the outline of the golf club head, the metal hollow casing 11 further having a shaft connecting portion 111, an open top portion 115, a side wall 116, and a closed bottom portion 112 which is integrally formed with the side wall 116, the side wall 116 having a cavity 113 to which the striking plate 13 is received and fixed, a through hole 114 formed in the bottom of the cavity 113 of the side wall 116;

(2) disposing a laminated member 12, which is made of a carbon fiber composite material in the metal hollow casing 11, the laminated member 12 being configured to correspondingly abut the internal wall face of the metal hollow casing 11, and having a generally flat top portion 121 fitted in the open top portion 115 of the metal hollow casing 11, in order to close the same, the laminated member 12 having a hole 122 which is aligned with the through hole 114 of the metal hollow casing 11;

(3) disposing the metal hollow casing 11 in a mold;

(4) extending a tube, with an elastic bag (not shown) connected to an end of the tube, into the laminated member 12 through the through hole 114 of the metal hollow casing 11 and the hole 122;

(5) introducing pressurized air into the elastic bag of the tube in order to swell the elastic bag, thereby compressing the laminated member 12 to abut against the internal wall face of the metal hollow casing 11;

(6) heating the metal hollow casing 11 in the mold, in order to cause the laminated member 12 to harden and attach to the internal wall of the metal hollow casing 11;

(7) allowing the pressurized air to escape from the elastic bag and withdrawing the tube from the metal hollow casing 11; and (8) fixing the striking plate 13 to the cavity 113, and fixing a shaft to the shaft connecting portion 111.

This method has the following disadvantages:

(1) A bulky air compressor must be prepared for supplying the pressurized air. Therefore, the total installation cost is high.

(2) The through hole 114 and the hole 122 are formed adjacent to the striking face in the side wall of the composite golf club head when the process for manufacturing the composite golf club head is completed. This adversely affects the structural strength of the composite golf club head.

SUMMARY OF THE INVENTION

It is therefore a main object of this invention to provide a method for producing a composite golf club head in which no bulky air compressor is needed, and no holes are formed adjacent to the striking face in the side wall of the composite golf club head, in order to reduce the installation cost, and to increase the overall structural strength of the composite golf club head.

Accordingly, the method for producing a composite golf club head comprises the steps of:

(1) forming a metal hollow casing which has an outline of a golf club head, the metal hollow casing having a shaft connecting portion, an open top portion, a side wall, and a closed bottom portion which is integrally formed with the side wall;

(2) disposing a bowl-shaped laminated member in the metal hollow casing, the bowl-shaped laminated member being made of a carbon fiber composite material, and being configured to correspondingly abut an internal wall face of the metal hollow casing, and having an open end adjacent to the open top portion of the metal hollow casing;

(3) providing an expansible pocket in the bowl-shaped laminated member, the expansible pocket containing a mixture of sodium nitrite, ammonium chloride and water;

(4) disposing a sheet of carbon fiber composite material over the open top portion of the metal hollow casing, in order to close the open top portion of the metal hollow casing and the open end of the bowl-shaped laminated member;

(5) disposing the metal hollow casing in a mold; and (6) heating the mold to a temperature of 140°-160° C. in order to allow the mixture in the expansible pocket to react and produce nitrogen gas, thereby swelling the expansible pocket and forcing the bowl-shaped laminated member to attach to the metal hollow casing, and allowing the sheet of carbon fiber composite material and the bowl-shaped laminated member to harden and connect integrally to each other.

Other features and advantages of this invention will become apparent in the following detailed description of the preferred embodiment of this invention with reference to the accompanying drawings.

DETAILED DESCRIPTION OF THE PREFERRED EMBODIMENT

Figure 1:
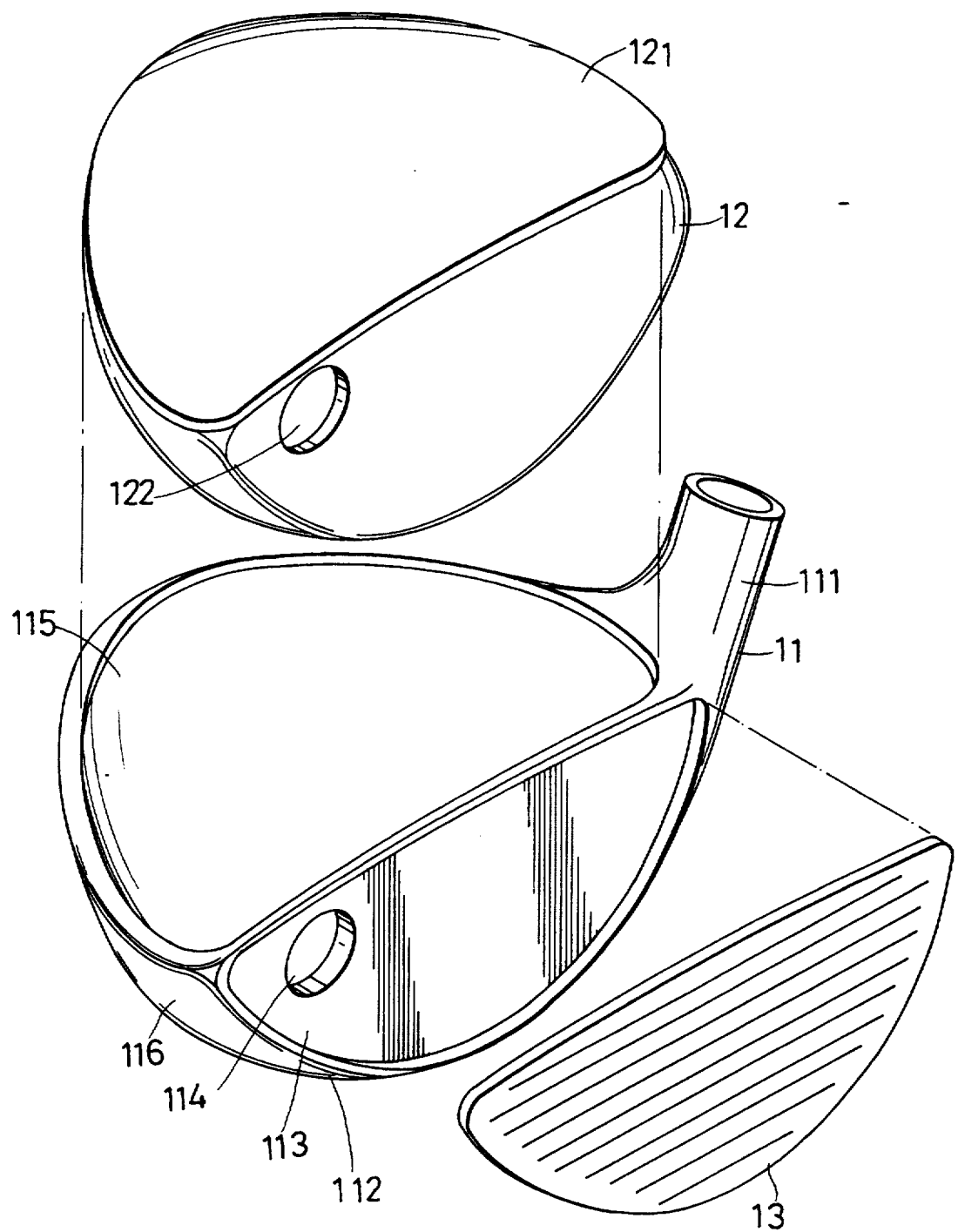
FIG. 1 is a perspective exploded view of a conventional composite golf club head.
Figure 2:
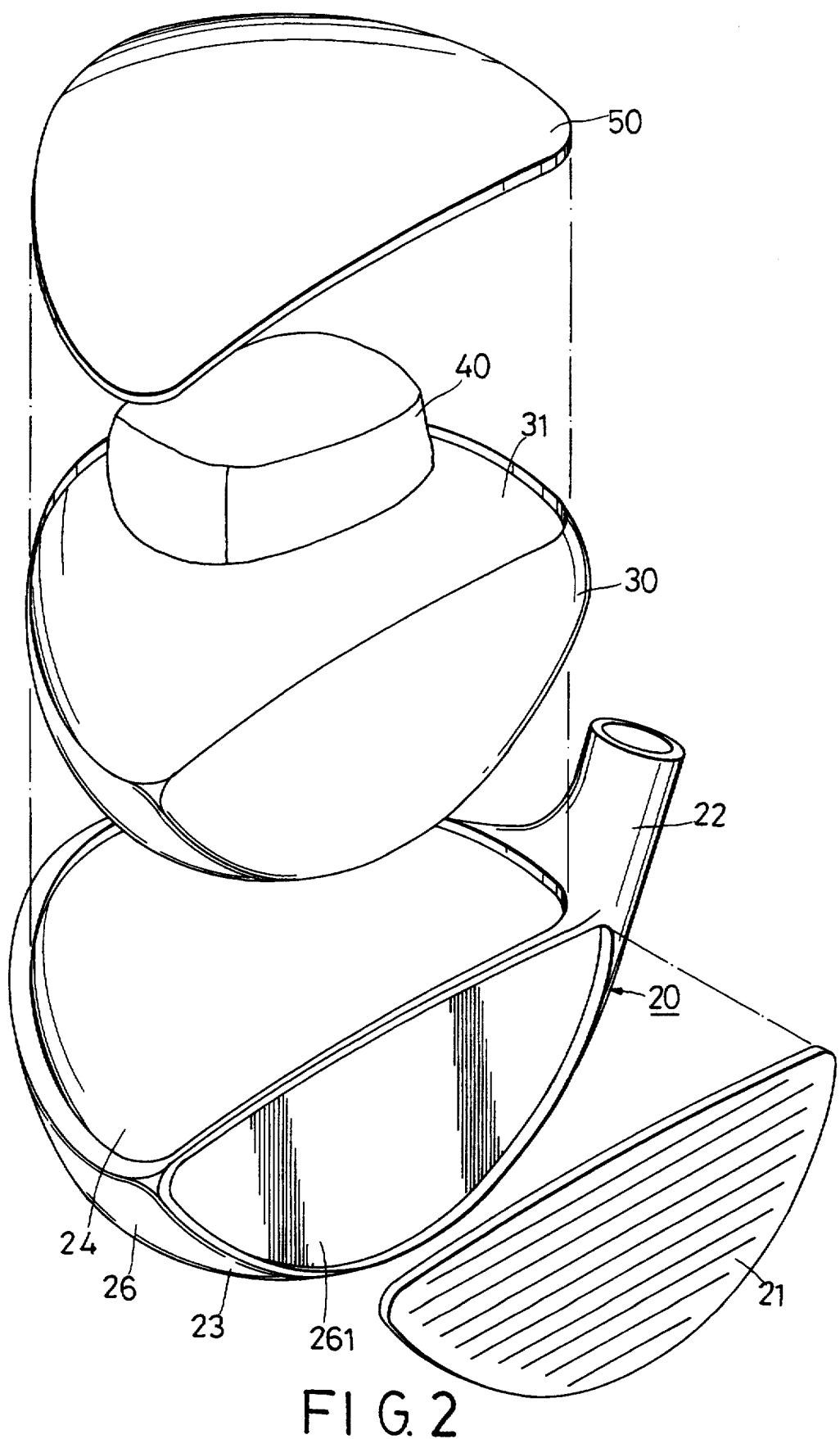
FIG. 2 is a perspective exploded view of a preferred embodiment of a composite golf club head which is made by means of the method of this invention.

FIG. 2 shows a perspective exploded view of a preferred embodiment of a composite golf club head, which is made by means of the method of this invention. A metal hollow casing 20 is made to have an outline of a golf club head by means of a known method. The metal hollow casing 20 has a shaft connecting portion 22, an open top portion 24, a side wall 24, and a closed bottom portion 23 which is integrally formed with the side wall 26. The side wall 26 has a cavity 261 which is adapted to receive a striking plate 21.

A bowl-shaped laminated member 30 is fitted into the metal hollow casing 20. The bowl-shaped laminated member 30 is made of a carbon fiber composite material. The bowl-shaped laminated member 30 is configured to correspondingly abut the internal wall face of the metal hollow casing 20 and has an open end 31 adjacent to the open top portion 24 of the metal hollow casing 20. An expansible pocket 40 is provided in the bowl-shaped laminated member 30. The expansible pocket 40 contains a mixture of sodium nitrite, ammonium chloride and water.

A sheet of carbon fiber composite material 50 is disposed over the open top portion 24 of the metal hollow casing 20 in order to close the open top portion 24 of the metal hollow casing 20 and the open end 31 of the bowl-shaped laminated member 30.

Figure 3:
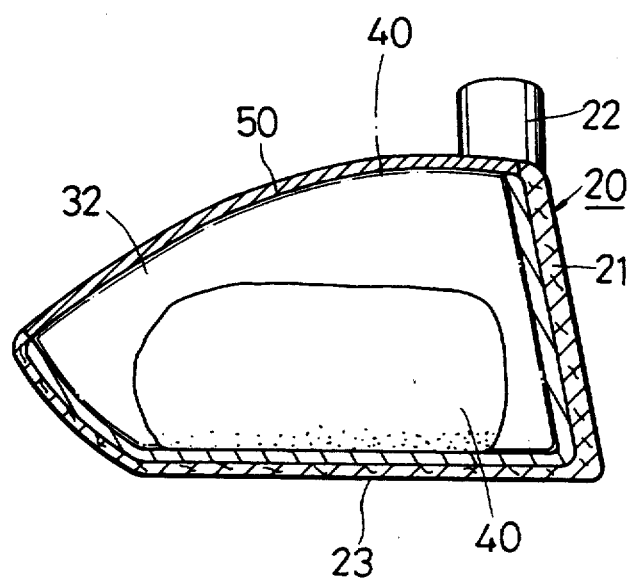
FIG. 3 is a longitudinal sectional schematic view showing the expansible pocket swelling in an enclosed chamber in the bowl-shaped laminated member, by means of a phantom line, according to this invention.

The metal hollow casing 20 is disposed in a mold, and is heated to a temperature of 140°–160° C. in order to allow the mixture in the expansible pocket 40 to react and produce nitrogen gas. Therefore, the expansible pocket 40 is swelled and the bowl-shaped laminated member 30 is forced to attach to the metal hollow casing 20, as best illustrated in FIG. 3. Meanwhile, the sheet of carbon fiber composite material 50 and the bowl-shaped laminated member 30 will harden and connect integrally to each other. Thereby, the expansible pocket 40 will be sealed with an enclosed chamber 32 which is defined by the bowl-shaped laminated member 30 and the sheet of carbon fiber composite material 50. The striking plate 21 is then fixed to the cavity 261 of the metal hollow casing 20, and a composite golf club head is obtained.

Preferably, the shaft connecting portion 22 of the metal hollow casing 20, and the harden bowl-shaped laminated member 30, and the swelled expansible pocket 40 are then drilled through to form a through hole 25 (see FIG. 2), in order to allow the product of the reaction to flow out of the metal hollow casing 20.

It has been found that this method for producing a composite golf club head has the following advantages:
(1) No bulky air compressor is needed. Therefore, the installation cost can be reduced.
(2) No hole is formed adjacent to the striking face in the side wall of the composite golf club head.

Therefore, better overall structural strength of the composite golf club head can be obtained compared with the prior art.

With this invention thus explained, it is apparent that numerous modifications and variations can be made without departing from the scope and spirit of this invention. It is therefore intended that this invention be limited only as indicated in the appended claims.

I claim:

1. A method for producing a composite golf club head, comprising the steps of:
   (1) forming a metal hollow casing which has an outline of a golf club head, said metal hollow casing having a shaft connecting portion, an open top portion, a side wall, and a closed bottom portion which is integrally formed with said side wall;
   (2) disposing a bowl-shaped laminated member in said metal hollow casing, said bowl-shaped laminated member being made of a carbon fiber composite material, and being configured to correspondingly abut an internal wall face of said metal hollow casing, and having an open end adjacent to said open top portion of said metal hollow casing;
   (3) providing an expansible pocket in said bowl-shaped laminated member, said expansible pocket containing a mixture of sodium nitrite, ammonium chloride and water;
   (4) disposing a sheet of carbon fiber composite material over said open top portion of said metal hollow casing in order to close said open top portion of said metal hollow casing and said open end of said bowl-shaped laminated member;
   (5) disposing said metal hollow casing in a mold;
   (6) heating said mold to a temperature of 140°–160° C. in order to allow said mixture in said expansible pocket to react and produce nitrogen gas, thereby swelling said expansible pocket and forcing said bowl-shaped laminated member to attach to said metal hollow casing, and allowing said sheet of carbon fiber composite material and said bowl-shaped laminated member to harden and connect integrally to each other.

2. A method for producing a composite golf club head as claimed in claim 1, further comprising the step of drilling through said shaft connecting portion of said metal hollow casing, through said hardened bowl-shaped laminated member, and through said swelled expansible pocket, in order to allow the product of said reaction to flow out of said metal hollow casing.

* * * * *